United States Patent
Kitamura et al.

(10) Patent No.: US 10,610,957 B2
(45) Date of Patent: Apr. 7, 2020

(54) THREE-DIMENSIONAL LAMINATING AND SHAPING APPARATUS, THREE-DIMENSIONAL LAMINATING AND SHAPING APPARATUS CONTROL METHOD, AND THREE-DIMENSIONAL LAMINATING AND SHAPING APPARATUS CONTROL PROGRAM

(71) Applicant: TECHNOLOGY RESEARCH ASSOCIATION FOR FUTURE ADDITIVE MANUFACTURING, Tokyo (JP)

(72) Inventors: Shinichi Kitamura, Tokyo (JP); Nari Tsutagawa, Tokyo (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 669 days.

(21) Appl. No.: 15/122,661

(22) PCT Filed: Mar. 25, 2016

(86) PCT No.: PCT/JP2016/059642
§ 371 (c)(1),
(2) Date: Aug. 31, 2016

(87) PCT Pub. No.: WO2017/163402
PCT Pub. Date: Sep. 28, 2017

(65) Prior Publication Data
US 2018/0147653 A1    May 31, 2018

(51) Int. Cl.
*B23K 15/00* (2006.01)
*B33Y 30/00* (2015.01)
(Continued)

(52) U.S. Cl.
CPC ........ *B23K 15/0086* (2013.01); *B22F 3/1055* (2013.01); *B33Y 30/00* (2014.12);
(Continued)

(58) Field of Classification Search
CPC .... B23K 15/006; B23K 15/004; B33Y 10/00; B33Y 30/00; B22F 3/1055; B22F 2003/1056
(Continued)

(56) References Cited

U.S. PATENT DOCUMENTS 4,976,843 A    12/1990  Ward et al.
6,326,635 B1 *  12/2001  Innes .................. H01J 37/09
                                                 250/505.1
(Continued)

FOREIGN PATENT DOCUMENTS

DE    22 11 597 A1    9/1973
EP    2 937 163 A1   10/2015
(Continued)

OTHER PUBLICATIONS

Supplementary European Search Report (SESR) dated Jul. 30, 2018 for Application No. EP 16 82 5687.
(Continued)

*Primary Examiner* — Brian W Jennison
(74) *Attorney, Agent, or Firm* — Ladas & Parry LLP

(57) ABSTRACT

This invention effectively prevents charge-up of an unsintered region. A three-dimensional laminating and shaping apparatus includes a linear funnel for recoating the material of a three-dimensional laminated and shaped object onto a shaping surface on which the three-dimensional laminated and shaped object is to be shaped. The three-dimensional laminating and shaping apparatus also includes an electron gun for generating an electron beam. The three-dimensional laminating and shaping apparatus further includes a charge
(Continued)

shield for shielding the material recoated on the shaping surface when irradiating the material with the electron beam. In addition, the apparatus includes a vertical driving mechanism for vertically moving the charge shield.

9 Claims, 10 Drawing Sheets

(51) Int. Cl.
 *B22F 3/105* (2006.01)
 *B33Y 50/02* (2015.01)
(52) U.S. Cl.
 CPC ....... *B22F 2003/1056* (2013.01); *B33Y 50/02* (2014.12); *Y02P 10/295* (2015.11)
(58) Field of Classification Search
 USPC ..................................................... 219/76.12
 See application file for complete search history.

(56) References Cited

U.S. PATENT DOCUMENTS

| | | | |
|---|---|---|---|
| 9,162,393 B2 | 10/2015 | Ackelid | |
| 9,162,394 B2 | 10/2015 | Ackelid | |
| 2004/0262261 A1* | 12/2004 | Fink | ........................ B29C 71/04 216/66 |
| 2008/0131546 A1* | 6/2008 | Perret | ................... B22F 3/1055 425/143 |
| 2015/0110910 A1* | 4/2015 | Hartmann | ............... B29C 64/20 425/78 |
| 2015/0306700 A1* | 10/2015 | Honda | ............... B23K 15/0086 219/121.17 |
| 2018/0169938 A1 | 6/2018 | Inenaga et al. | |

FOREIGN PATENT DOCUMENTS

| | | |
|---|---|---|
| EP | 3 189 960 A1 | 7/2017 |
| JP | 6-136520 A | 5/1994 |
| JP | 2008-107208 A | 5/2008 |
| JP | 2010-526694 A | 8/2010 |
| JP | 2015-175012 A | 10/2015 |
| WO | 2008/147306 A1 | 12/2008 |

OTHER PUBLICATIONS

Espacenet English abstract of DE 22 11 597 A1.
International Search Report (ISR) dated Jun. 21, 2016 for International Application No. PCT/JP2016/059642.
Written Opinion (WO) dated Jun. 21, 2016 for International Application No. PCT/JP2016/059642.
J-PlatPat English abstract of JP 2015-175012 A.
J-PlatPat English abstract of JP 6-136520 A.
J-PlatPat English abstract of JP 2008-107208 A.

* cited by examiner

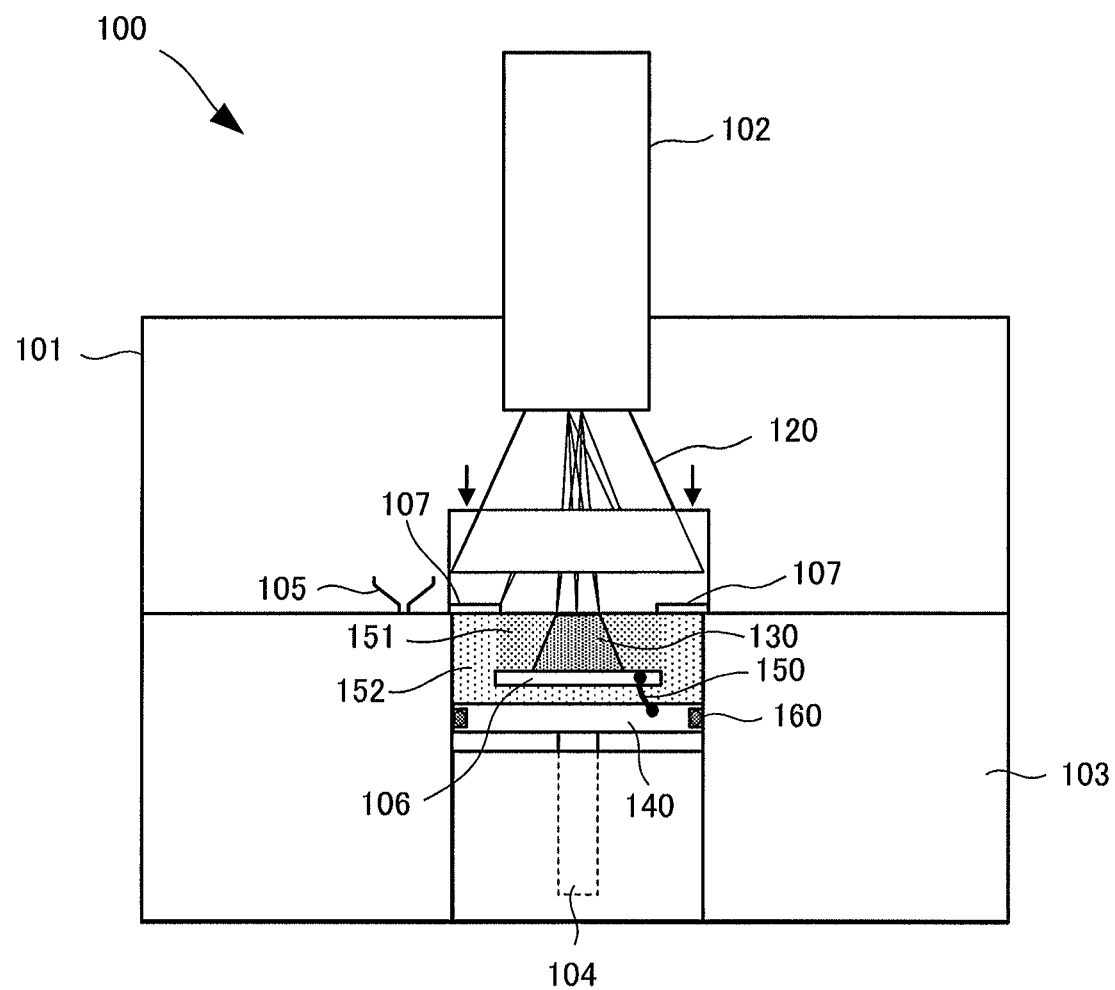
F I G. 1

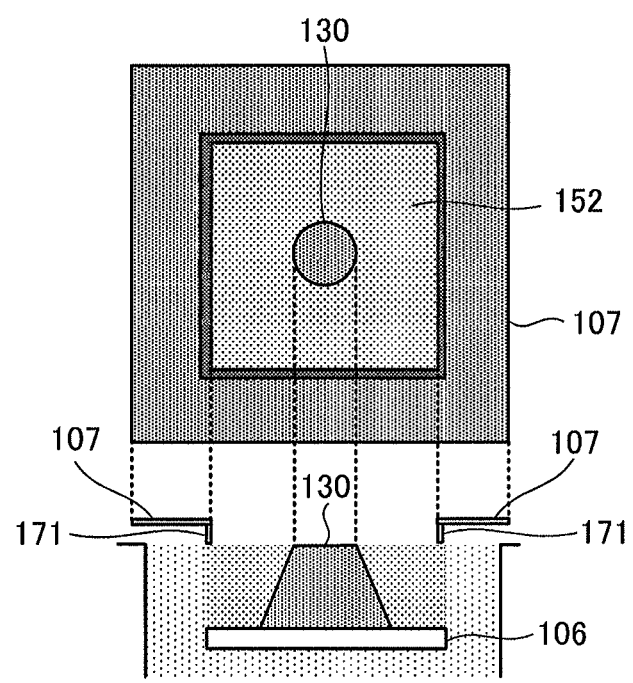
F I G. 3B

THREE-DIMENSIONAL LAMINATING AND SHAPING APPARATUS, THREE-DIMENSIONAL LAMINATING AND SHAPING APPARATUS CONTROL METHOD, AND THREE-DIMENSIONAL LAMINATING AND SHAPING APPARATUS CONTROL PROGRAM

RELATED APPLICATION

This application is an application under 35 U.S.C. 371 of International Application No. PCT/JP2016/059642 filed on Mar. 25, 2016, the entire contents of which are incorporated herein by reference.

TECHNICAL FIELD

The present invention relates to a three-dimensional laminating and shaping apparatus, a three-dimensional laminating and shaping apparatus control method, and a three-dimensional laminating and shaping apparatus control program.

BACKGROUND ART

In the above-mentioned technical field, patent literature 1 has disclosed a technique of supplying an inert gas as an auxiliary gas into a vacuum chamber.

CITATION LIST

Patent Literature

Patent literature 1: Japanese PCT National Publication No. 2010-526694

SUMMARY OF THE INVENTION

Technical Problem

Unfortunately, the technique described in the abovementioned literature cannot effectively prevent charge-up of an unsintered region.

The present invention enables to provide a technique of solving the above-described problem.

Solution to Problem

One aspect of the present invention provides a three-dimensional laminating and shaping apparatus comprising:
a material recoater that recoats a material of a three-dimensional laminated and shaped object onto a shaping surface on which the three-dimensional laminated and shaped object is to be shaped;
an electron gun that generates an electron beam; and
a shield that shields the material recoated on the shaping surface when irradiating the material with the electron beam.

Another aspect of the present invention provides a three-dimensional laminating and shaping apparatus control method comprising:
causing a material recoater to recoat a material of a three-dimensional laminated and shaped object onto a shaping surface on which the three-dimensional laminated and shaped object is to be shaped;
causing an electron gun to generate an electron beam; and
causing a shield to shield the material recoated on the shaping surface when irradiating the material with the electron beam.

Still another aspect of the present invention provides a three-dimensional laminating and shaping apparatus control program for causing a computer to execute a method, comprising:
causing a material recoater to recoat a material of a three-dimensional laminated and shaped object onto a shaping surface on which the three-dimensional laminated and shaped object is to be shaped;
causing an electron gun to generate an electron beam; and
causing a shield to shield the material recoated on the shaping surface when irradiating the material with the electron beam.

Advantageous Effects of Invention

The present invention can effectively prevent charge-up of an unsintered region.

BRIEF DESCRIPTION OF DRAWINGS

FIG. 1 is a view showing the arrangement of a three-dimensional laminating and shaping apparatus according to the first embodiment of the present invention;

FIG. 3B shows a plan view and side view of another example of the charge shield of the three-dimensional laminating and shaping apparatus according to the first embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[First Embodiment]

A three-dimensional laminating and shaping apparatus 100 according to the first embodiment of the present invention will be explained with reference to FIG. 1. The three-dimensional laminating and shaping apparatus 100 is a powder bed type apparatus. The three-dimensional laminating and shaping apparatus 100 irradiates a material spread on a shaping surface by a recoater or the like with an electron beam, thereby melting the material, solidifying the material, and completing laminating of one layer of the material. When completing the laminating of one layer, the three-dimensional laminating and shaping apparatus 100 moves down a shaping table by a height equivalent to the height of one layer, and spreads (recoats) the material of the next layer by the recoater or the like. After spreading the material, the three-dimensional laminating and shaping apparatus 100 irradiates the material with the electron beam, thereby melting the material, solidifying the material, and completing laminating of the material of the next one layer. The three-dimensional laminating and shaping apparatus 100 shapes a desired three-dimensional laminated and shaped object by repeating this operation.

<Technical Premise>

Figure 4:
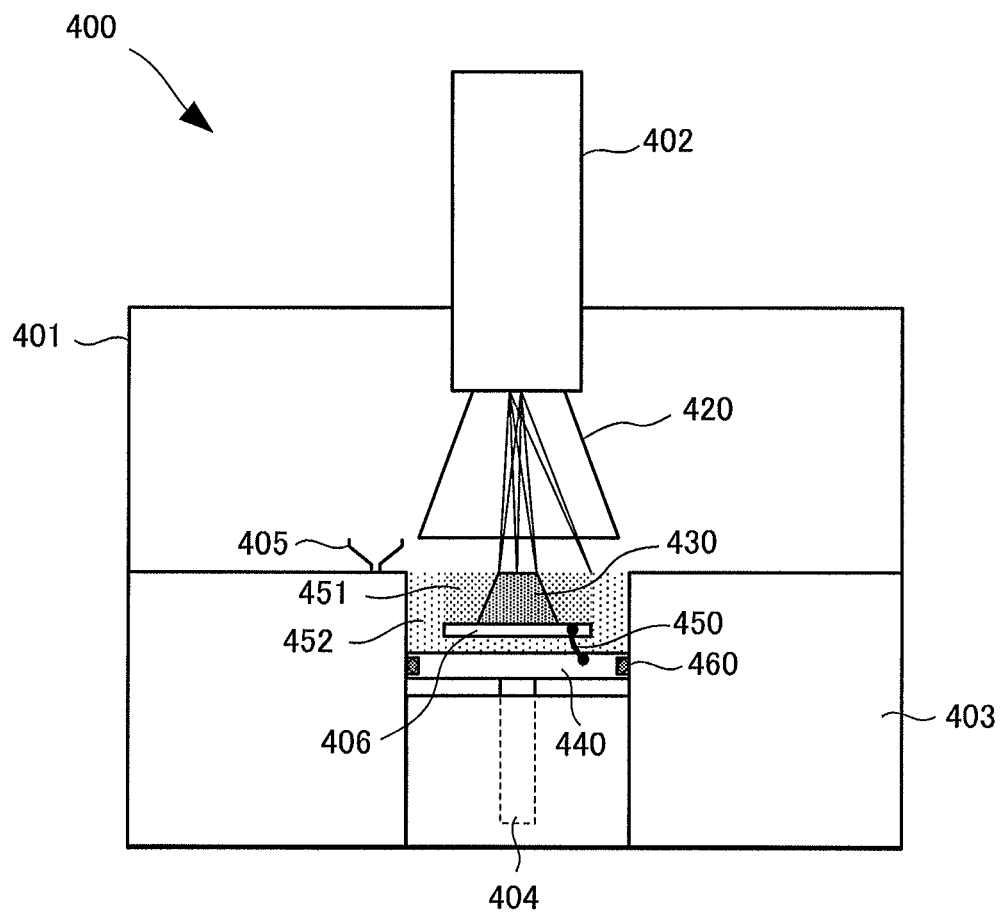
FIG. 4 is a view showing an example of the arrangement of a three-dimensional laminating and shaping apparatus according to the technical premise of the three-dimensional laminating and shaping apparatus according to the first embodiment of the present invention.

FIG. 4 is a view showing an example of the arrangement of a three-dimensional laminating and shaping apparatus according to the technical premise of the three-dimensional laminating and shaping apparatus according to this embodiment.

«Arrangement»

An electron gun 402 is attached to a vacuum vessel 401, and a shaping frame table (shaping box) 403 having a circular or square section is installed in the vacuum vessel 401. A Z-axis driving mechanism 404 is installed in a lower portion inside the shaping frame table 403, and capable of driving a powder table 440 in the Z direction by a rack-and-pinion, ball screw, or the like.

A heat-resistant flexible seal 460 is formed in the gap between the shaping frame table 403 and powder table 440, thereby giving slidability and sealability by the flexible seal 460 and the inner sliding surface of the shaping frame table 403. A vacuum pump (not shown) evacuates the vacuum vessel 401 and maintains the interior of the vacuum vessel 401 in a vacuum state.

On the powder table 440, a shaping plate (base plate) 406 on which a three-dimensional laminated and shaped object 430 is to be shaped is arranged in a state in which it is floated by a metal powder. To prevent electrical floating, the shaping plate 406 is grounded to the powder table 440 at a GND potential by a GND line 450. The three-dimensional laminated and shaped object 430 is shaped on the shaping plate 406. When shaping each layer, a linear funnel (recoater) 405 filled with a metal powder spreads the metal powder to almost the same height as that of the upper surface of the shaping frame table 403 (a spread powder 452).

A metal powder hopper (not shown) appropriately replenishes the metal powder to the linear funnel 405. The three-dimensional laminated and shaped object 430 is constructed by two-dimensionally melting the spread (unsintered) powder 452 in a one-layer region of the three-dimensional laminated and shaped object 430 by an electron beam from the electron gun 402, and overlaying the layers. A region of the powder 452 spread on the shaping plate 406 except for the three-dimensional laminated and shaped object 430 is a powder (spread (calcined) powder) 451 calcined by the electron beam from the electron gun 402, and has conductivity.

An anti-deposition cover 420 is attached between the shaping surface and electron gun 402, and prevents deposition of a metal vapor generated during shaping and deposition of metal sputtering by fireworks to the inner walls of the vacuum vessel 401.

«Operation»

The upper surface of the shaping plate 406 covered with the metal powder in three directions is set at almost the same height as that of the upper surface of the shaping frame table 403, and a region slightly narrower than the whole region of the upper surface of the shaping plate 406 is irradiated with the electron beam from the electron gun 402, thereby preheating the region to a temperature at which the metal powder is calcined.

When starting shaping, the Z-axis driving mechanism 404 slightly moves down the powder table 440 such that the upper surface of the shaping plate 406 is arranged in a position slightly lower than the upper surface of the shaping frame table 403. ΔZ as this slight lowering is equivalent to the layer thickness in the Z direction after that. The linear funnel 405 filled with the metal powder is moved to the opposite side along the upper surface of the shaping plate 406, and the region slightly narrower than the shaping plate 406 on which the metal powder is spread by ΔZ is irradiated with the electron beam from the electron gun 402, thereby heating the irradiated region, and reliably calcining the metal powder in the irradiated region.

In accordance with a two-dimensional shape obtained by slicing a prearranged designed three-dimensional laminated and shaped object (shaped model) at an interval of ΔZ, this two-dimensional region is melted by the electron beam from the electron gun 402. After one layer is melted and solidified, the region slightly narrower than the shaping plate 406 is irradiated with the electron beam from the electron gun 402 again, thereby heating the irradiated region, and preparing for spreading of the metal powder.

After the irradiated region is heated to a predetermined temperature, the electron beam is turned off, the Z-axis driving mechanism 404 moves down the powder table 440 by ΔZ, the linear funnel 405 is moved to the opposite side along the upper surface of the shaping frame table 403 again, and the metal powder is spread on the preceding layer by ΔZ. Then, the metal powder is reliably calcined by the electron beam from the electron gun 402, and a two-dimensional-shape region corresponding to the layer is melted. The three-dimensional laminated and shaped object 430 is shaped by repeating this process.

Figure 5:
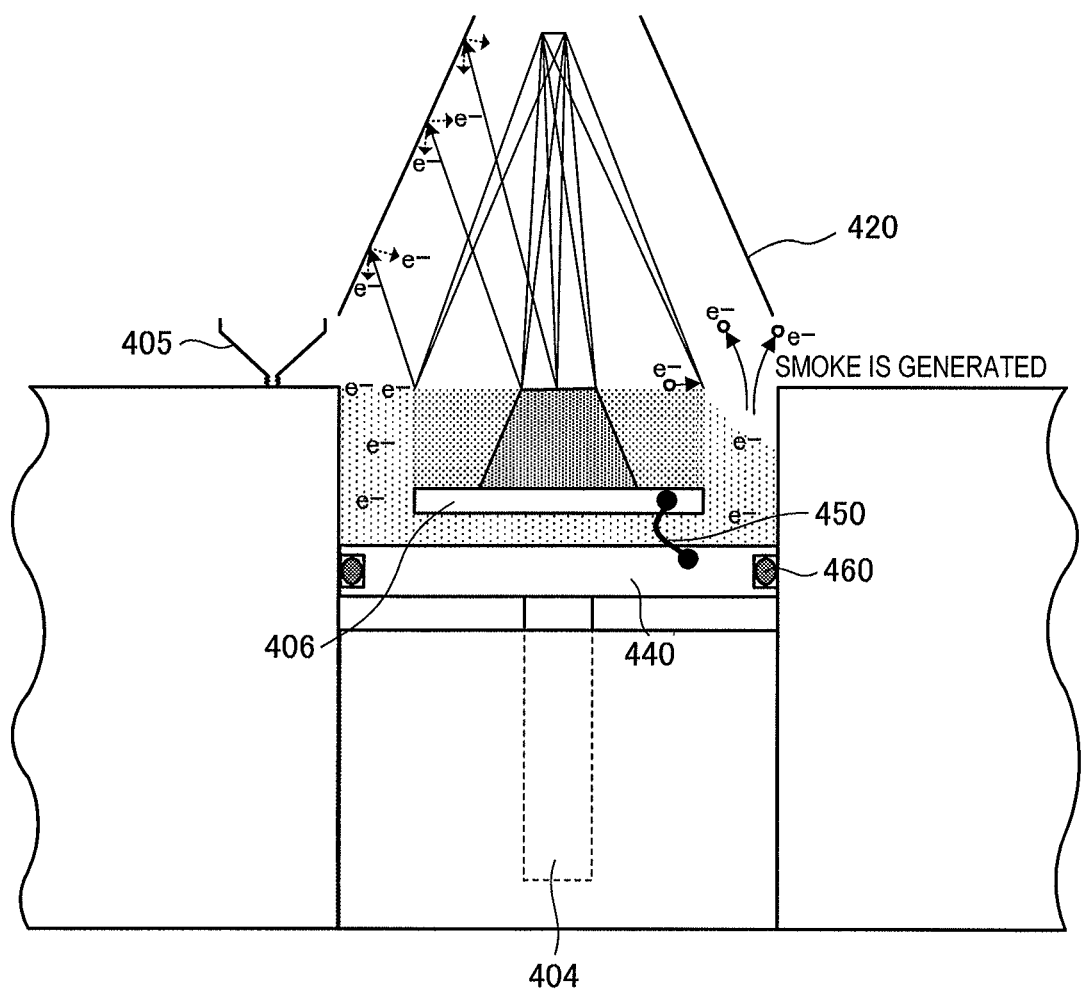
FIG. 5 is a view for explaining a mechanism of generating a smoke phenomenon by the three-dimensional laminating and shaping apparatus according to the technical premise of the three-dimensional laminating and shaping apparatus according to the first embodiment of the present invention.

FIG. 5 is a view for explaining a mechanism of generating a smoke phenomenon by the three-dimensional laminating and shaping apparatus according to the technical premise of the three-dimensional laminating and shaping apparatus according to this embodiment. FIG. 5 is an enlarged view of a portion below the electron gun 402 shown in FIG. 4. As shown in FIG. 5, when the electron beam is emitted for calcination or melting, a large amount of backscattered electrons and secondary electrons are generated from the irradiation position. The backscattered electrons collide against the inner walls of the anti-deposition cover 420 above the irradiation position, thereby further emitting backscattered electrons and secondary electrons.

As described above, a large amount of electrons exist above the shaping surface covered with the anti-deposition cover 420, and an uncalcined metal powder is easily negatively charged because individual powder particles are electrically insulated by the surface oxide film. Therefore, if a charged metal powder forms due to insufficient calcination in a region to be irradiated with the electron beam, the charged metal powder is blown off to the outside unsintered region, and the charge balance breaks down in that region. If the charge balance breaks down, the repulsive force balance obtained by the electrostatic force also breaks down, and the metal powder particles scatter by repulsion, i.e., a smoke phenomenon occurs. To suppress this, a method expecting neutralization by generating gas ions by supplying a gas such as He gas is used. However, the smoke phenomenon still occurs if calcination is insufficient.

<Technique According to this Embodiment>
«Arrangement»

Figure 2:
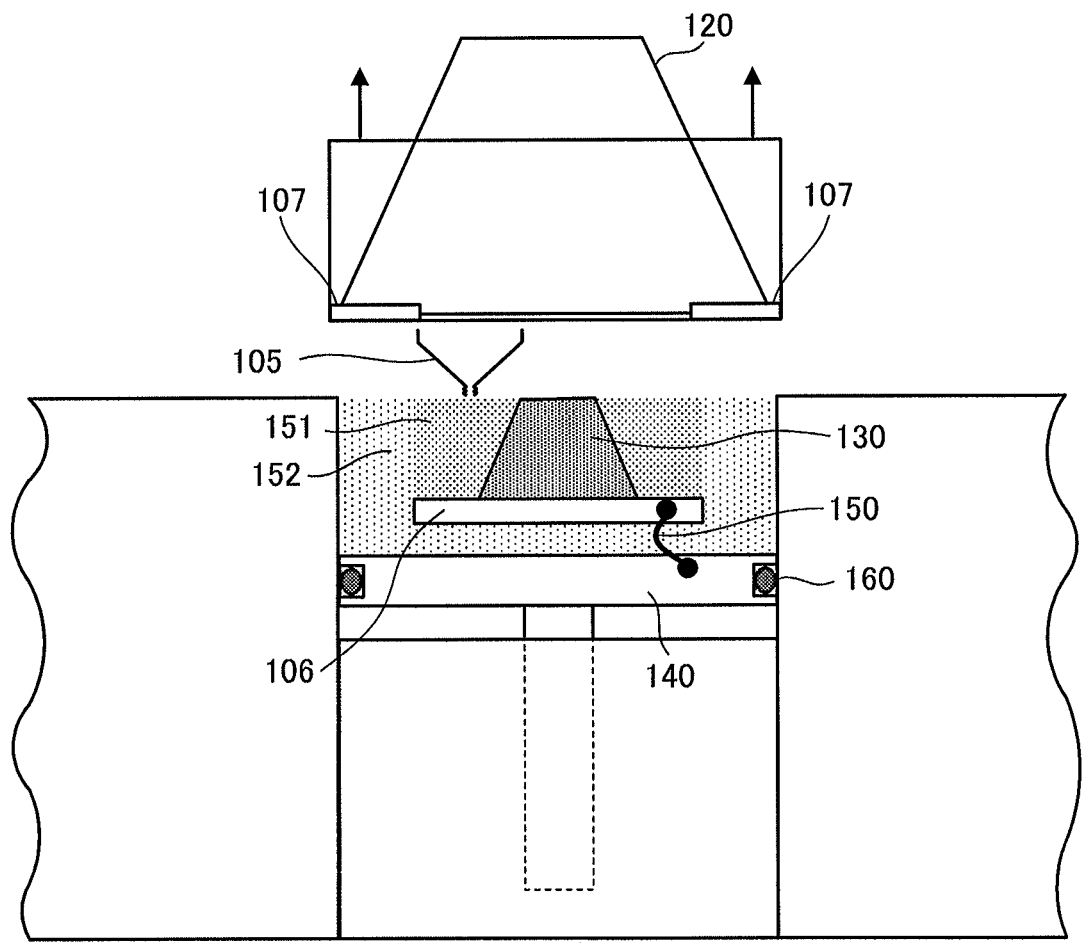
FIG. 2 is a partially enlarged view showing the arrangement of the three-dimensional laminating and shaping apparatus according to the first embodiment of the present invention.

FIG. 1 is a view showing the arrangement of the three-dimensional laminating and shaping apparatus according to this embodiment. FIG. 2 is a partially enlarged view showing the arrangement of the three-dimensional laminating and shaping apparatus according to this embodiment. The three-dimensional laminating and shaping apparatus 100 includes a vacuum vessel 101, an electron gun 102, a shaping frame table 103, a Z-axis driving mechanism 104, a linear funnel 105, a shaping plate 106, and an anti-deposition cover 107. Note that the three-dimensional laminating and shaping apparatus 100 will be explained below by taking a powder bed type shaping apparatus as an example.

The charge shield 107 has an almost rectangular shape when viewed from above, and has an inside opening matching the shape of the shaping plate 106 so that an electron beam arrives on the upper surface of the shaping plate 106. The inside opening of the charge shield 107 is positioned near the center of the charge shield 107, and is a circular opening when the shaping plate 106 is circular, and a rectangular opening when the shaping plate 106 is rectangular. Also, the charge shield 107 has the shape of a flat plate when viewed sideways.

The charge shield 107 covers an unsintered region formed by an unsintered powder 152 in a region between the shaping frame table 103 and shaping plate 106, i.e., the charge shield 107 is a shield mask. Also, since the charge shield 107 has the opening, the charge shield 107 does not cover a calcined region formed by a calcined powder 151 in the region between the shaping frame table 103 and shaping plate 106. Typical examples of the material of the charge shield 107 are a conductive material such as a metal and an alloy such as stainless steel. The material is preferably the same kind of material as the metal powder as the material of a three-dimensional laminated and shaped object 130. However, the material is not limited to these materials as long as the material can function as a shield.

A vertical driving mechanism (lifting mechanism) (not shown) is attached to the charge shield 107. When irradiating the shaping plate 106 with an electron beam, the charge shield 107 moves down onto the shaping surface. In addition, the charge shield 107 is electrically grounded to GND although not shown.

«Operation»

The upper surface of the shaping plate 106 covered with the metal powder in three directions is set at almost the same height as that of the upper surface of the shaping frame table 103, and the charge shield 107 is moved down to the upper surface of the shaping plate 106, thereby covering the metal powder between the shaping plate 106 and shaping frame table 103. In this state, the charge shield 107 is in contact with the metal powder. A region slightly narrower than the whole region of the upper surface of the shaping plate 106 (i.e., a region where the inside opening of the charge shield 107 is not irradiated with the electron beam) is irradiated with the electron beam from the electron gun 102, thereby preheating the shaping plate 106 to a temperature at which the metal powder is completely calcined.

When starting shaping, the Z-axis driving mechanism 104 moves down the shaping table 140 so that the upper surface of the shaping plate 106 is arranged in a position slightly lower than the upper surface of the shaping frame table 103. ΔZ as this slight lowering is equivalent to the layer thickness in the Z direction after that.

The charge shield 107 is moved up, the linear funnel (recoater) 105 filled with the metal powder is moved to the opposite side along the upper surface of the shaping plate 106, and the metal powder corresponding to ΔZ is recoated and spread on and around the shaping plate 106. After the linear funnel 105 has moved to the outside of the charge shield 107, the charge shield 107 is moved down to the shaping surface again, thereby covering the metal powder between the shaping plate 106 and shaping frame table 103.

A region of the metal powder spread on the shaping plate 106, in which the electron beam does not irradiate the inside opening of the charge shield 107, is irradiated with the electron beam from the electron gun 102, thereby heating the irradiated region, and reliably calcining the metal powder in the irradiated region.

In accordance with a two-dimensional shape obtained by slicing a prearranged designed three-dimensional laminated and shaped object (shaped model) at an interval of ΔZ, this two-dimensional-shape region is melted by the electron beam from the electron gun 102. After one layer is melted and solidified, the region slightly narrower than the shaping plate 106 is irradiated with the electron beam from the electron gun 102 again, thereby heating the irradiated region, and preparing for spreading of the metal powder. After the irradiated region is heated to a predetermined temperature, the electron beam is turned off, and the charge shield 107 is moved up.

The Z-axis driving mechanism 104 moves down the powder table 140 by ΔZ, the linear funnel 105 is moved to the opposite side along the upper surface of the shaping frame table 103 again, the metal powder is spread on the preceding layer by ΔZ, and the charge shield 107 is moved down to the shaping surface again. The region in which the electron beam does not irradiate the inside opening of the charge shield 107 is irradiated with the electron beam from the electron gun 102, thereby reliably calcining the newly spread metal powder, and a two-dimensional-shape region corresponding to the layer is melted. The three-dimensional laminating and shaping apparatus 100 shapes the three-dimensional laminated and shaped object 130 by repeating this process. It is also possible to install or embed a heater in a mask portion outside the opening of the charge shield 107, and make the temperature of the metal powder below the mask portion (inside the mask portion) equal to that of the shaping surface. This suppresses a decease (large change) in temperature of the shaping surface (metal powder) when the metal powder between the shaping plate 106 and shaping frame table 103 is covered with the charge shield 107.

The material of the charge shield 107 is desirably a conductive material having a low thermal conductivity and high heat resistance, and examples are titanium, a titanium alloy such as 64Ti, and stainless steel. Note that in this embodiment, the example in which the charge shield 107 is vertically moved has been explained. However, the moving direction of the charge shield 107 is not limited to this, and may also be moved in, e.g., the left-and-right direction or the direction of depth.

Figure 3A:
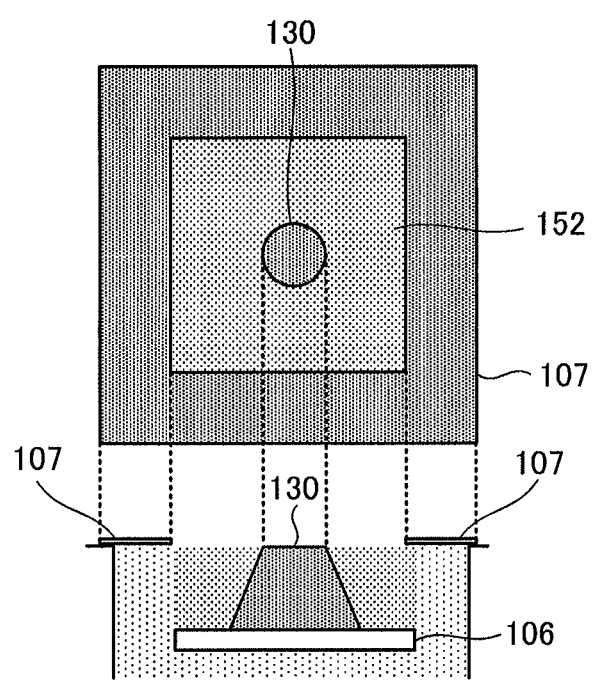
FIG. 3A shows a plan view and side view of a charge shield of the three-dimensional laminating and shaping apparatus according to the first embodiment of the present invention.

FIG. 3A shows a plan view and side view of the charge shield 107 of the three-dimensional laminating and shaping apparatus according to this embodiment. The side surface shape of the charge shield 107 is the shape of a flat plate and has a thickness of 0.5 mm or less, but the thickness may be smaller or larger than that. Note that in order to suppress an inflow of heat from the shaping surface, an inflow of heat from the shaping surface is suppressed by decreasing the thickness.

FIG. 3B shows a plan view and side view of another example of the charge shield 107 of the three-dimensional laminating and shaping apparatus according to this embodiment. A contactor 171 is attached to the lower surface (the surface close to the shaping surface) of the charge shield 107 shown in FIG. 3B. The charge shield 107 has a shape which linearly comes in contact with a calcined region by the contactor 171, and contacts the calcined region by the contactor 171. Therefore, the contact area between the charge shield 107 and calcined region decreases. Since the contact area between the charge shield 107 and the shaping surface (calcined region) decreases, an inflow of heat from the shaping surface can be suppressed.

Figure 3C:
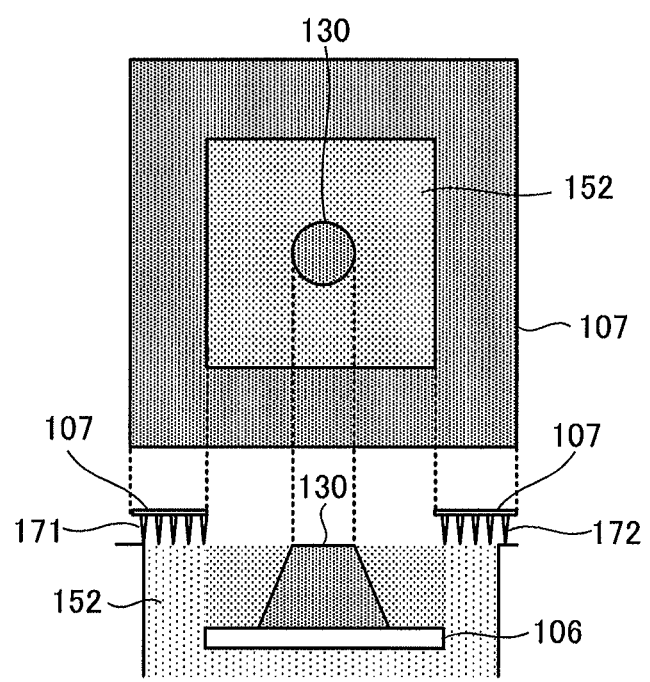
FIG. 3C shows a plan view and side view of still another example of the charge shield of the three-dimensional laminating and shaping apparatus according to the first embodiment of the present invention.

FIG. 3C shows a plan view and side view of still another example of the charge shield 107 of the three-dimensional laminating and shaping apparatus according to this embodiment. Referring to FIG. 3C, in the charge shield 107 having the flat plate shape shown in FIG. 3A, a plurality of thin needle-like contactors are attached to the lower side of the flat plate, or a brush-like (comb-like) contactor is formed on the lower side of the flat plate, thereby further decreasing the contact area. An inflow of heat can be suppressed by thus decreasing the contact area between the charge shield 107 and shaping surface.

Note that the shaping plate 106 (the shaping surface) is represented by a rectangular shape in FIGS. 3A to 3C, but the same shall apply even when the shaping plate 106 has a circular shape, polygonal shape, or the like.

Figure 6:
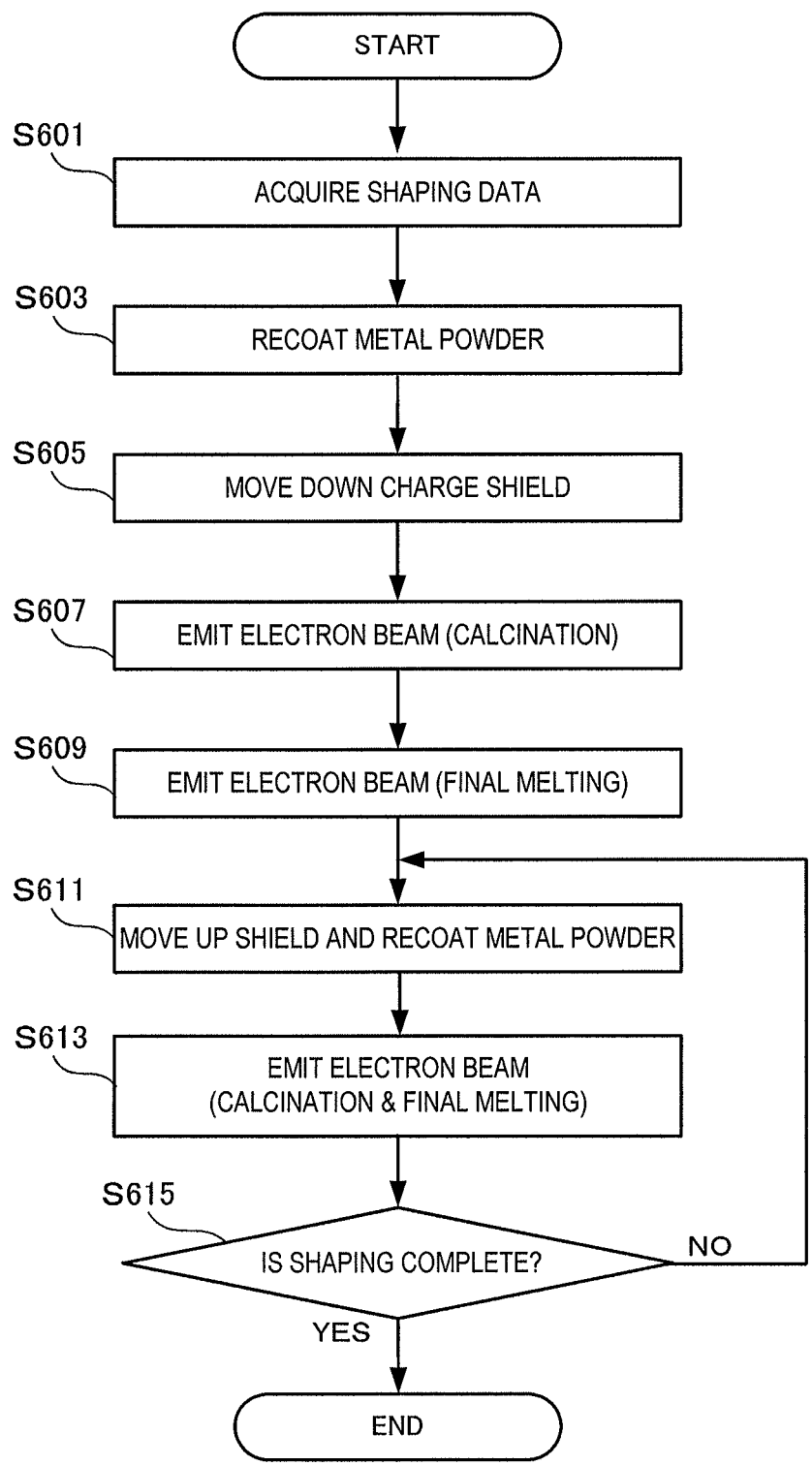
FIG. 6 is a flowchart for explaining the procedure of the three-dimensional laminating and shaping apparatus according to the first embodiment of the present invention.

FIG. 6 is a flowchart for explaining the procedure of the three-dimensional laminating and shaping apparatus according to this embodiment. In step S601, the three-dimensional laminating and shaping apparatus 100 acquires shaping data of the three-dimensional laminated and shaped object 130. In step S603, the three-dimensional laminating and shaping apparatus 100 recoats and spreads the metal powder on the shaping surface. In step S605, the three-dimensional laminating and shaping apparatus 100 moves down the charge shield 107 and brings it into contact with the shaping surface. In step S607, the three-dimensional laminating and shaping apparatus 100 performs calcination by emitting an electron beam. In step S609, the three-dimensional laminating and shaping apparatus 100 performs final melting of the metal powder of one layer by emitting the electron beam based on the acquired shaping data. In step S611, the three-dimensional laminating and shaping apparatus 100 moves up the charge shield 107, and recoats and spreads the metal powder on the shaping surface while moving the linear funnel 105. In step S613, the three-dimensional laminating and shaping apparatus 100 performs calcination and final melting of the spread metal powder, thereby melting and solidifying the metal powder of one layer. In step S615, the three-dimensional laminating and shaping apparatus 100 determines whether shaping is complete. If the three-dimensional laminating and shaping apparatus 100 determines that shaping of the three-dimensional laminated and shaped object 130 is complete (YES in step S615), the three-dimensional laminating and shaping apparatus 100 terminates the process. If the three-dimensional laminating and shaping apparatus 100 determines that shaping is not complete (NO in step S615), the three-dimensional laminating and shaping apparatus 100 repeats the process from step S611.

In this embodiment, when irradiating the shaping surface with an electron beam, an unsintered powder between the shaping plate and shaping frame table is masked with the charge shield. This makes it possible to suppress charge-up of the unsintered powder 152 in an unsintered region, and prevent smoke.

[Second Embodiment]

Figure 7:
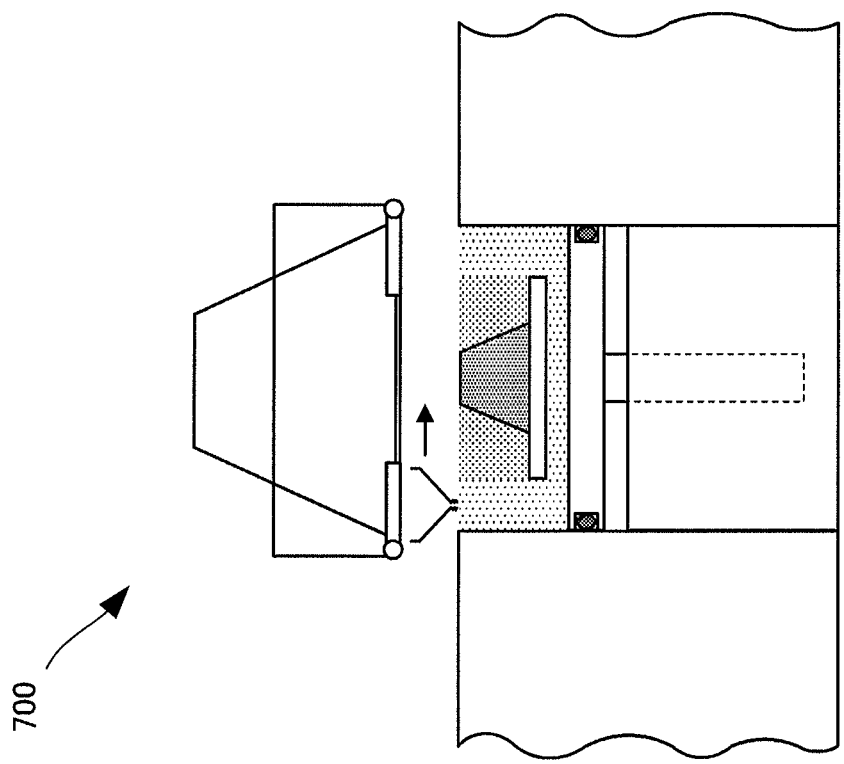
FIG. 7 is a partially enlarged view showing the arrangement of a three-dimensional laminating and shaping apparatus according to the second embodiment of the present invention.
Figure 7:
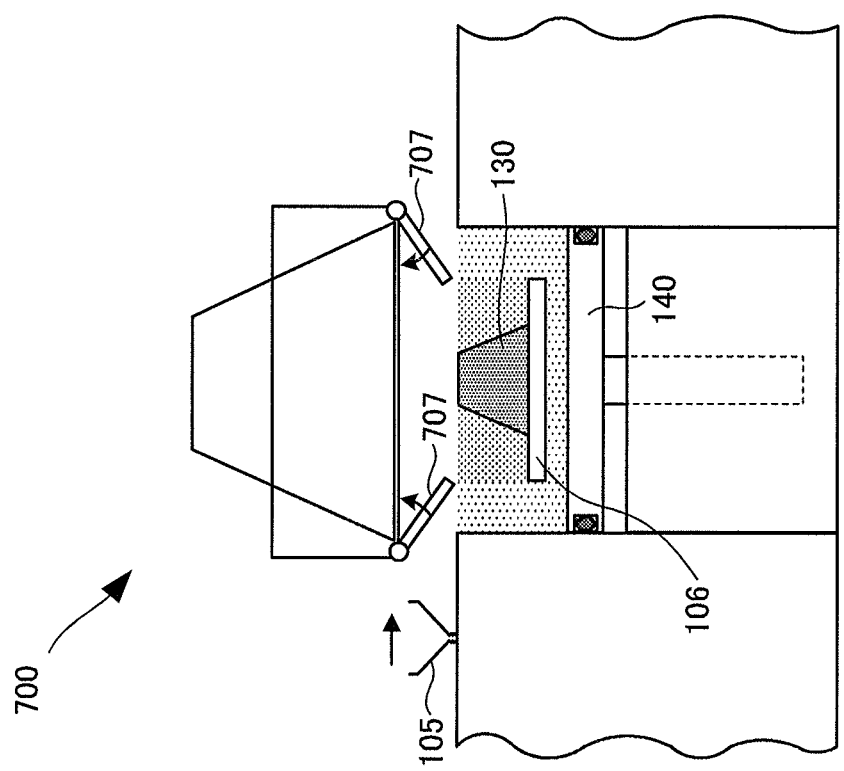

Next, a three-dimensional laminating and shaping apparatus according to the second embodiment of the present invention will be explained with reference to FIG. 7. FIG. 7 is a partial enlarged view for explaining the arrangement of a three-dimensional laminating and shaping apparatus 700 according to this embodiment. In the first embodiment, the charge shield 107 is vertically moved. In this embodiment, as shown in FIG. 7, a charge shield (shield plate) 707 having fulcrums (rotational shafts) on the four sides is so attached as to hang toward a shaping surface. The four corners overlap each other when the charge shield 707 is in contact with the shaping surface, so an unsintered region cannot be seen from above. A vacuum compatible motor or vacuum incompatible motor controls the rotational angle of the rotational shaft. When a linear funnel 105 as a material recoater spreads a metal powder on the shaping surface, the charge shield 707 pivots on the rotational shafts and moves up.

In this embodiment, the apparatus configuration can be simplified because the charge shield is moved by the rotational shafts. Also, when irradiating the shaping surface with an electron beam, the charge shield as a conductive material masks an unsintered powder between a shaping plate and shaping frame table. This makes it possible to suppress charge-up of an unsintered powder 152 in an unsintered region, and prevent smoke.

[Third Embodiment]

Figure 8:
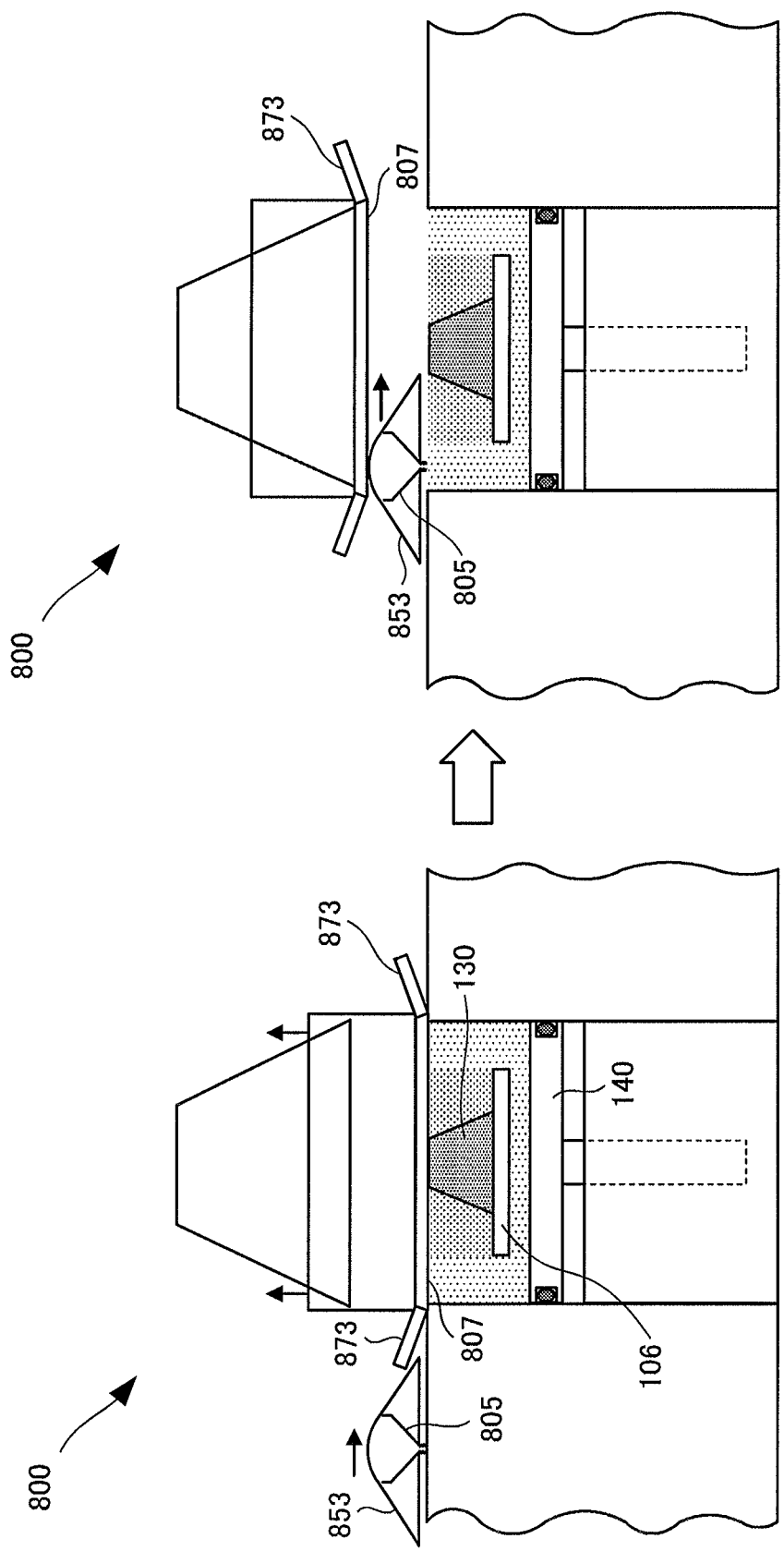
FIG. 8 is a partially enlarged view showing the arrangement of a three-dimensional laminating and shaping apparatus according to the third embodiment of the present invention.

A three-dimensional laminating and shaping apparatus according to the third embodiment of the present invention will be explained below with reference to FIG. 8. FIG. 8 is a partially enlarged view for explaining the arrangement of a three-dimensional laminating and shaping apparatus 800 according to this embodiment. The three-dimensional laminating and shaping apparatus 800 includes a linear funnel 805 and a charge shield 807. Also, the linear funnel 805 has a translation cam (driver) 853, and the charge shield 807 has a translation cam (follower) 873.

In this embodiment, when the linear funnel 805 spreads a metal powder, the charge shield 807 moves up in synchronism with the movement of the linear funnel 805. In this case, an unsintered region is always covered with the charge shield 807. When the linear funnel 805 spreads the metal powder on a shaping surface, the translation cam 853 of the linear funnel 805 pushes up the translation cam 873 of the charge shield 807. That is, the charge shield 807 vertically moves in accordance with the movement of the linear funnel 805 having the translation cam 853.

Accordingly, the charge shield 807 leaves the shaping surface only when the linear funnel 805 passes over the shaping surface. Note that in order to decrease the friction between the translation cams 853 and 873, a roller may also be formed in one or both of them.

In the arrangement as described above, the charge shield 807 covers an unsintered region except when spreading the metal powder. To implement failsafe, however, it is also possible to link control of an electron beam and control of the charge shield 807, and enable emission of the electron beam only when the shaping surface is covered with the charge shield 807. Whether the charge shield 807 has reached the shaping surface can mechanically be detected by using a limit switch or the like.

In this embodiment, the linear funnel and charge shield have the translation cams. Since this makes a charge shield lifting mechanism unnecessary, it is possible to simplify the apparatus configuration, and easily synchronize the movements of the linear funnel and charge shield. Also, when irradiating the shaping surface with an electron beam, the charge shield as a conductive material masks an unsintered powder between the shaping plate and shaping frame table. This makes it possible to suppress charge-up of the unsintered powder in an unsintered region, and prevent smoke.

[Other Embodiments]

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A three-dimensional laminating and shaping apparatus comprising:
   a material recoater that recoats a material of a three-dimensional laminated and shaped object onto a shaping surface on which the three-dimensional laminated and shaped object is to be shaped;
   an electron gun that generates an electron beam; and
   a shield that shields the material recoated on the shaping surface when irradiating the material with the electron beam, wherein the shield is in a shape of a flat plate having an opening through which the electron beam passes and which covers a non-sintered region which is not irradiated with the electron beam among the materials sprayed on the shaping surface,
   wherein the three-dimensional laminating and shaping apparatus is configured to control the electron beam to irradiate the materials through the opening of the shield so as not to irradiate the shield when the materials are irradiated with the electron beam to sinter the materials.

2. The three-dimensional laminating and shaping apparatus according to claim 1, further comprising a vertical driver that vertically moves said shield.

3. The three-dimensional laminating and shaping apparatus according to claim 1, wherein said shield is a flat plate that pivots on a fulcrum.

4. The three-dimensional laminating and shaping apparatus according to claim 1, wherein
   said material recoater includes a translation cam, and
   said shield vertically moves in accordance with a movement of said material recoater.

5. The three-dimensional laminating and shaping apparatus according to claim 1, wherein said shield shields an unsintered region of the material recoated on the shaping surface, which is not to be sintered by the electron beam.

6. The three-dimensional laminating and shaping apparatus according to claim 1, wherein said shield includes a heater.

7. The three-dimensional laminating and shaping apparatus according claim 1, wherein said shield comprises a rectangular or circular flat plate, and has an opening near a center.

8. A three-dimensional laminating and shaping apparatus control method comprising:
   recoating a material of a three-dimensional laminated and shaped object onto a shaping surface on which the three-dimensional laminated and shaped object is to be shaped;
   generating an electron beam;
   shielding the material recoated on the shaping surface when irradiating the material with the electron beam, wherein the shield is in a shape of a flat plate having an opening through which the electron beam passes and which covers a non-sintered region which is not irradiated with the electron beam among the materials sprayed on the shaping surface; and
   controlling the electron beam to irradiate the materials through the opening of the shield so as not to irradiate the shield when the materials are irradiated with the electron beam to sinter the materials.

9. A non transitory computer readable medium storing a three-dimensional laminating and shaping apparatus control program for causing a computer to execute a method, comprising:
   recoating a material of a three-dimensional laminated and shaped object onto a shaping surface on which the three-dimensional laminated and shaped object is to be shaped;
   generating an electron beam;
   shielding the material recoated on the shaping surface when irradiating the material with the electron beam, wherein the shield is in a shape of a flat plate having an opening through which the electron beam passes and which covers a non-sintered region which is not irradiated with the electron beam among the materials sprayed on the shaping surface, and
   controlling the electron beam to irradiate the materials through the opening of the shield so as not to irradiate the shield when the materials are irradiated with the electron beam to sinter the materials.

* * * * *